United States Patent
Chen et al.

(10) Patent No.: US 8,699,219 B2
(45) Date of Patent: Apr. 15, 2014

(54) ELECTRONIC DEVICE, ASSEMBLING METHOD OF ELECTRONIC MODULE AND DISASSEMBLING METHOD OF ELECTRONIC MODULE

(75) Inventors: Hung-Chi Chen, Taipei (TW); Chia-Te Tsao, Taipei (TW); Chung-Kuo Lai, Taipei (TW); Ming-Chi Liu, Taipei (TW)

(73) Assignee: Compal Electronics, Inc., Taipei (TW)

( * ) Notice: Subject to any disclaimer, the term of this patent is extended or adjusted under 35 U.S.C. 154(b) by 211 days.

(21) Appl. No.: 13/154,451

(22) Filed: Jun. 7, 2011

(65) Prior Publication Data

US 2012/0250229 A1  Oct. 4, 2012

(30) Foreign Application Priority Data

Mar. 31, 2011 (TW) .............................. 100111307 A (51) Int. Cl.
*G06F 1/16* (2006.01)
*H05K 5/00* (2006.01)
*H05K 7/00* (2006.01)

(52) U.S. Cl.
USPC ............ 361/679.39; 361/679.01; 361/679.33; 361/679.37

(58) Field of Classification Search
USPC .......... 361/728, 730, 679.2, 670.3, 732, 753, 361/759, 679.31–39, 679.55, 56, 6
See application file for complete search history.

(56) References Cited

U.S. PATENT DOCUMENTS

| 6,556,446 | B1* | 4/2003 | Hwang .......................... 361/728 |
| 6,684,089 | B1* | 1/2004 | Lee .............................. 455/575.3 |
| 2010/0039766 | A1* | 2/2010 | Chiang et al. ............ 361/679.34 |
| 2010/0091443 | A1* | 4/2010 | Lam et al. ................. 361/679.33 |
| 2012/0008286 | A1* | 1/2012 | Suzuki ......................... 361/730 |

FOREIGN PATENT DOCUMENTS

TW  M350957  2/2009

OTHER PUBLICATIONS

"Office Action of Taiwan Counterpart Application", issued on Feb. 23, 2013, p. 1-p. 5.

* cited by examiner

*Primary Examiner* — Jenny L Wagner
*Assistant Examiner* — Ahmad D Barnes
(74) *Attorney, Agent, or Firm* — Jianq Chyun IP Office (57) ABSTRACT

An electronic device is provided, which includes a bottom casing, an electronic module, at least a positioning part and an upper cover. The electronic module is disposed in the bottom casing. The positioning part is connected to the electronic module. The upper cover includes a cover body and a positioning portion. The cover body is assembled to the bottom casing. The positioning portion is connected to the cover body. A structural interference between the positioning portion and the positioning part makes the electronic module positioned. In addition, an assembling method of electronic module and a disassembling method of electronic module are also provided.

7 Claims, 9 Drawing Sheets

ELECTRONIC DEVICE, ASSEMBLING METHOD OF ELECTRONIC MODULE AND DISASSEMBLING METHOD OF ELECTRONIC MODULE

CROSS-REFERENCE TO RELATED APPLICATION

This application claims the priority benefit of Taiwan application serial no. 100111307, filed Mar. 31, 2011. The entirety of the above-mentioned patent application is hereby incorporated by reference herein and made a part of this specification.

BACKGROUND OF THE INVENTION

1. Field of the Invention

The invention generally relates to an electronic device, an assembling method of electronic module and a disassembling method of electronic module, and more particularly, to an electronic device with an upper cover and a bottom casing and an assembling and a disassembling method of the electronic module thereof.

2. Description of Related Art

The advanced development of computer technology largely increases the amount of data requiring computer process. Advanced computer technology is also capable of processing a variety of data types and therefore a larger storage capacity is needed. Since an optical disc is advantageous in cheap price, carrying convenience, large storage capacity, easy-storing, longer storage life and robust from damage, general traditional magnetic storage medium has been gradually replaced by optical disc, and optical disc has become an indispensable optical storage medium nowadays. Along with the broad uses of optical discs, an optical disc drive (ODD) for reading the data of an optical disc becomes an indispensable electronic product in life as well.

For example, many notebook computers are equipped with an ODD to read data. With a conventional notebook computer, an ODD is fixed mostly by using screws, where as assembling, the ODD needs to be placed into the casing of the notebook computer, followed by tightening the screws to fix the ODD. As disassembling, the screws are firstly detached so as to take out the ODD; therefore, the conventional structure requires more labor and more time for both assembling and disassembling.

SUMMARY OF THE INVENTION

Accordingly, the invention is directed to an electronic device, in which the electronic module thereof is capable of being quickly assembled and disassembled.

The invention is also directed to an assembling method of electronic module, capable of quickly assembling the electronic module.

The invention is further directed to a disassembling method of electronic module, capable of quickly disassembling the electronic module.

The invention provides an electronic device, which includes a bottom casing, an electronic module, at least a positioning part and an upper cover. The electronic module is disposed in the bottom casing. The positioning part is connected to the electronic module. The upper cover includes a cover body and a positioning portion. The cover body is assembled to the bottom casing. The positioning portion is connected to the cover body. A structural interference between the positioning portion and the positioning part makes the electronic module positioned.

In an embodiment of the present invention, the above-mentioned positioning part includes a fixing portion, a joining portion and a retaining portion. The fixing portion is fixed at the electronic module. The joining portion is connected to the fixing portion. The retaining portion is connected to the joining portion. The positioning portion is located between the retaining portion and the electronic module to position the electronic module.

In an embodiment of the present invention, the above-mentioned positioning portion has at least a positioning groove. The width of the positioning groove is greater than the outer diameter of the joining portion. The width of the positioning groove is less than the outer diameter of the retaining portion. The joining portion goes through the positioning groove. The positioning groove is located between the retaining portion and the electronic module.

In an embodiment of the present invention, the above-mentioned positioning portion is a folding wall extending from the cover body. The cover body is suitable to be moved away from the bottom casing so as to bring the positioning portion move away from the positioning part.

In an embodiment of the present invention, the above-mentioned upper cover further includes an elastic arm. The elastic arm is connected between the cover body and the positioning portion. The elastic arm is suitable to be deformed to bring the positioning portion move away from the positioning part.

In an embodiment of the present invention, the above-mentioned upper cover further includes an elastic arm and a pulling handle. The elastic arm is connected between the cover body and the positioning portion and has a hole. The inner diameter of the hole is greater than the outer diameter of the positioning part. The hole is connected to the positioning portion. The positioning portion is connected between the elastic arm and the pulling handle. When a force is applied on the pulling handle, the elastic arm is deformed under the force to bring a displacement of the positioning portion and to align the hole to the positioning part.

In an embodiment of the present invention, the above-mentioned bottom casing has an operation opening. The pulling handle extends towards the bottom casing and is aligned with the operation opening so as to be pulled via the operation opening.

In an embodiment of the present invention, the above-mentioned electronic device further includes a cover part, which detachably covers the operation opening.

The invention also provides an assembling method of electronic module. First, a bottom casing is provided. Next, an upper cover is provided, in which the upper cover includes a cover body and a positioning portion connected to the cover body. Then, the positioning part is fixed at the electronic module. After that, the electronic module is disposed in the bottom casing and the cover body is assembled to the bottom casing so that a structural interference between the positioning portion and the positioning part is established to position the electronic module.

In an embodiment of the present invention, the above-mentioned positioning portion is a folding wall extending from the cover body. After disposing the electronic module in the bottom casing, assembling the upper cover to the bottom casing to produce a structural interference between the positioning portion and the positioning part.

In an embodiment of the present invention, the above-mentioned upper cover further includes an elastic arm, the cover body has an operation opening. The elastic arm is connected between the cover body and the positioning portion and located in the operation opening. After assembling the upper cover at the bottom casing, pulling the elastic arm via the operation opening to make the elastic arm deform under force to bring the positioning portion moving and thereby to allow the positioning part to move pass the positioning portion to provide a space for the electronic module to move into the bottom casing. After disposing the electronic module in the bottom casing, the elastic arm is restored to produce a structural interference between the positioning portion and the positioning part.

In an embodiment of the present invention, the above-mentioned upper cover further includes an elastic arm and a pulling handle. The elastic arm is connected between the cover body and the positioning portion and has a hole. The positioning portion is connected between the elastic arm and the pulling handle. After assembling the upper cover at the bottom casing, applying a force on the pulling handle to make the elastic arm deform under force to bring the hole moving and thereby to allow the positioning part to move pass the positioning portion via the hole to provide a space for the electronic module to move into the bottom casing. After disposing the electronic module in the bottom casing, the elastic arm is restored to produce a structural interference between the positioning portion and the positioning part.

In an embodiment of the present invention, the above-mentioned bottom casing has an operation opening. The pulling handle extends towards the bottom casing and is aligned with the operation opening. The method of applying a force on the pulling handle includes pulling the pulling handle via the operation opening.

The invention provides a disassembling method of electronic module suitable to disassemble an electronic module from a bottom casing. The electronic module is disposed in the bottom casing. A positioning part is connected to the electronic module. An upper cover includes a cover body and a positioning portion. The cover body is assembled to the bottom casing. A structural interference between the positioning portion and the positioning part is established to position the electronic module. First, the positioning portion moves away from the positioning part to release the structural interference. Next, the electronic module moves out from the bottom casing.

In an embodiment of the present invention, the above-mentioned positioning portion is a folding wall extending from the cover body. The method of releasing the structural interference includes moving the cover body away from the bottom casing to bring the positioning portion move away from the positioning part.

In an embodiment of the present invention, the above-mentioned upper cover further includes an elastic arm, the cover body has an operation opening. The elastic arm is connected between the cover body and the positioning portion and located in the operation opening. The step of releasing the structural interference includes pulling the elastic arm via the operation opening to make the elastic arm deform under force so as to bring the positioning portion move away from the positioning part.

In an embodiment of the present invention, the above-mentioned upper cover further includes an elastic arm and a pulling handle. The elastic arm is connected between the cover body and the positioning portion and has a hole. The positioning portion is connected between the elastic arm and the pulling handle. The step of releasing the structural interference includes applying a force on the pulling handle to make the elastic arm deform under force so as to bring the positioning portion move away from the positioning part.

In an embodiment of the present invention, the above-mentioned bottom casing has an operation opening. The pulling handle extends towards the bottom casing and is aligned with the operation opening. The step of applying a force to the pulling handle includes pulling the pulling handle via the operation opening.

In an embodiment of the present invention, the above-mentioned cover body has an operation opening. The rear end of the electronic module is aligned with the operation opening. The step of moving out the electronic module from the bottom casing includes pushing out the electronic module from the bottom casing via the operation opening.

Based on the depiction above, the positioning part of the invention is connected to the electronic module and the upper cover has a positioning portion. After placing the electronic module into the bottom casing, the upper cover is assembled to the bottom casing so as to position the electronic module through the structural interference between the positioning portion and the positioning part to finish the assembling. In addition, moving away the positioning portion from the positioning part is able to release the above-mentioned structural interference so as to take out the electronic module. In this way, the invention makes assembling and disassembling the electronic module more quickly and conveniently.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the preferred embodiments of the invention, examples of which are illustrated in the accompanying drawings. Wherever possible, the same reference numbers are used in the drawings and the description to refer to the same or like parts.

Figure 1:
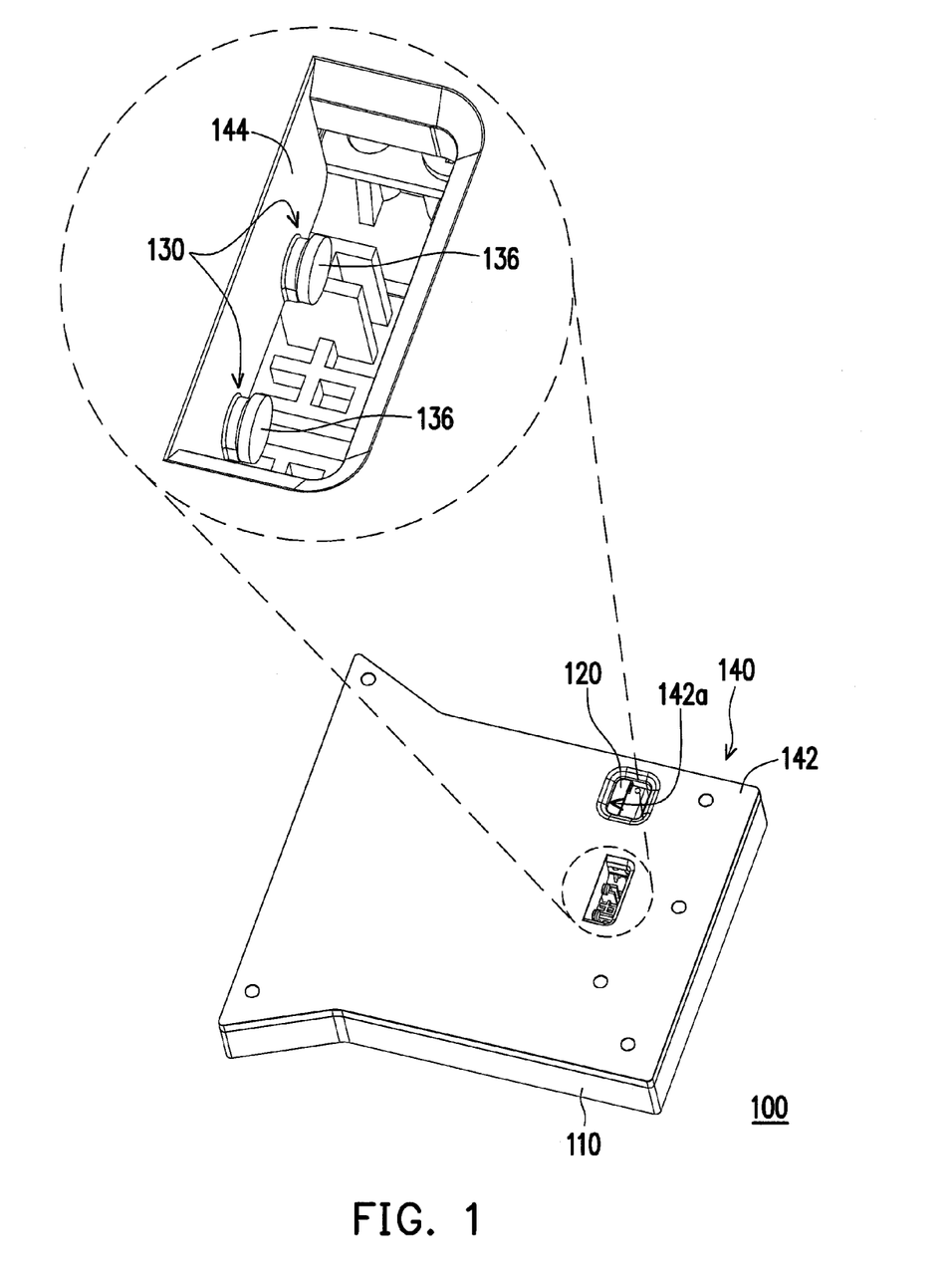
FIG. 1 is a schematic three-dimensional diagram of an electronic device according to an embodiment of the invention.
Figure 2:
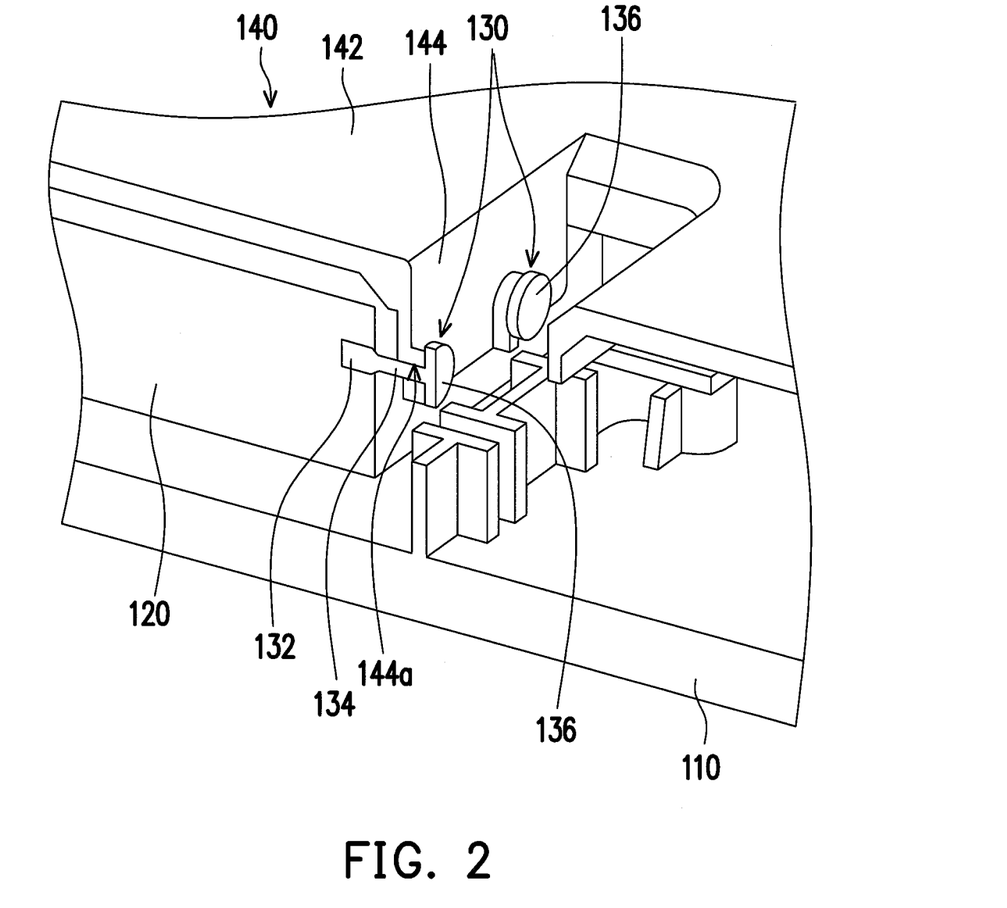
FIG. 2 is a schematic localized three-dimensional diagram of the electronic device in FIG. 1.

FIG. 1 is a schematic three-dimensional diagram of an electronic device according to an embodiment of the invention and FIG. 2 is a schematic localized three-dimensional diagram of the electronic device in FIG. 1. Referring to FIGS. 1 and 2, an electronic device 100 of the embodiment includes a bottom casing 110, an electronic module 120, at least a positioning part 130 (two are shown in FIG. 2) and an upper cover 140. The electronic module 120 is disposed in the bottom casing 110 and the positioning parts 130 are connected to the electronic module 120. The upper cover 140 includes a cover body 142 and a positioning portion 144 connected to the cover body 142. When the cover body 142 is assembled to the bottom casing 110 as shown by FIGS. 1 and 2, a structural interference is respectively produced between the positioning portion 144 and each of the two positioning parts 130 so as to fix the position of the electronic module 120.

With the above-mentioned disposition, after placing the electronic module 120 into the bottom casing 110, the upper cover 140 is assembled to the bottom casing 110 so as to position the electronic device 100 by means of the structural interferences between the positioning portion 144 and the positioning parts 130 to finish the assembling. In addition, the above-mentioned structural interferences can be released by moving the positioning portion 144 away from the positioning parts 130, so that the electronic module 120 is able to be taken out. In this way, the assembling and disassembling of the electronic module 120 can be more quickly and more conveniently. The electronic device 100 of the embodiment is, for example, a notebook computer and the electronic device 100 is, for example, an ODD of the notebook computer, which the invention is not limited to. In other embodiments, the electronic device 100 and the electronic module 120 can be devices of other kinds.

Referring to FIG. 2, in more details, each of the positioning parts 130 of the embodiment includes a fixing portion 132, a joining portion 134 and a retaining portion 136. The fixing portion 132 is fixed at the electronic module 120, the joining portion 134 is connected to the fixing portion 132 and the retaining portion 136 is connected to the joining portion 134. When the cover body 142 is assembled to the bottom casing 110 as shown by FIGS. 1 and 2, the positioning portion 144 would be located between the retaining portions 136 and the electronic module 120 to position the electronic module 120. In the embodiment, the positioning part 130 is, for example, half thread screw and the fixing portion 130 thereof has thread and is screwed at the electronic module 120, and the form of the positioning part 130 is not limited by the invention. In other embodiments, the positioning part 130 can be latch pin, screw with sleeve or other elements suitable to be fixed to the electronic module 120.

Figure 3:
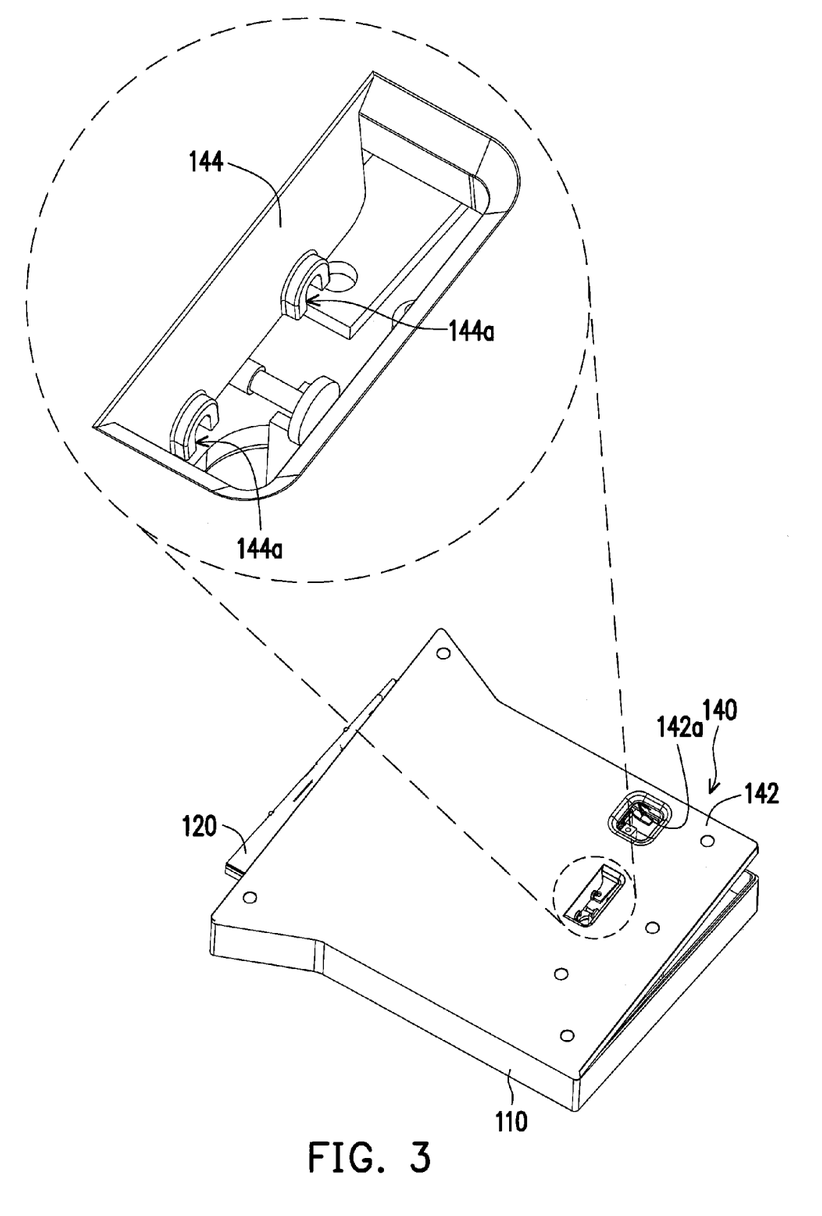
FIG. 3 is a schematic three-dimensional diagram showing the positioning parts of FIG. 1 are separated from the positioning portion.

FIG. 3 is a schematic three-dimensional diagram showing the positioning parts of FIG. 1 separated from the positioning portion. Referring to FIGS. 2 and 3, in the embodiment, the positioning portion 144 has at least a positioning groove 144a (two are shown). The width of the positioning grooves 144a is greater than the outer diameter of the joining portions 134 but less than the outer diameter of the retaining portions 136, so that the joining portions 134 can go through the positioning grooves 144a to allow the positioning grooves 144a be located between the retaining portions 136 and the electronic module 120. In this way, the position of the electronic module 120 is fixed by the structural interferences between the retaining portions 136 and the positioning portion 144.

Referring to FIG. 1, in the embodiment, the cover body 142 has an operation opening 142a. The rear end of the electronic module 120 is aligned with the operation opening 142a so that the electronic module 120 is suitable to be pushed out from the bottom casing 110 via the operation opening 142a. As shown by FIGS. 1-3, the positioning portion 144 of the embodiment is a folding wall extending from the cover body 142, and the cover body 142 is suitable to move away from the bottom casing 110, thereby brings the positioning grooves 144a to move away from the positioning parts 130, so that the electronic module 120 can be taken out. The invention does not limit the form of the positioning portion 144 and some examples are described below with accompanying drawings.

Figure 4:
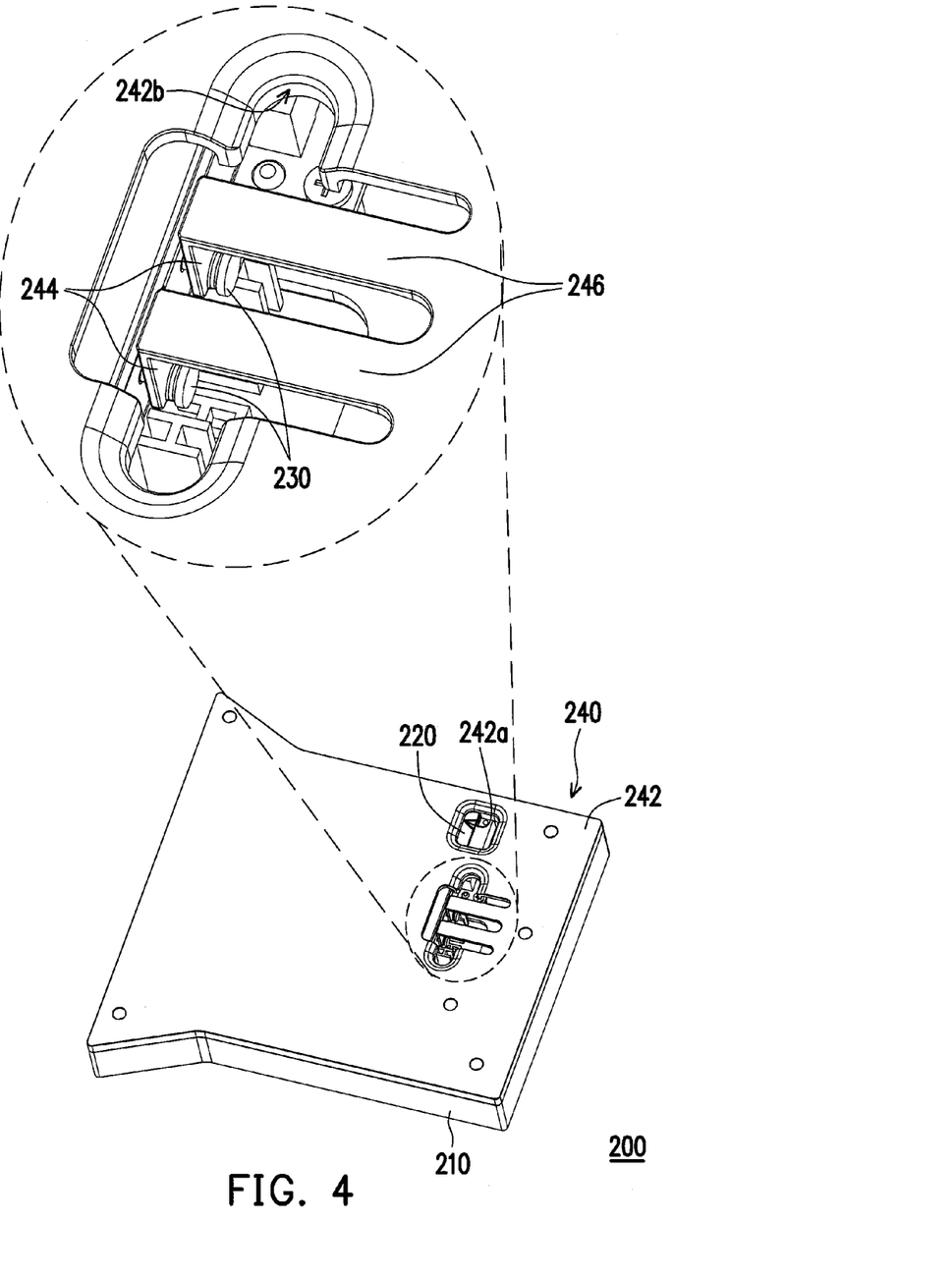
FIG. 4 is a schematic three-dimensional diagram of an electronic device according to another embodiment of the invention.
Figure 5:
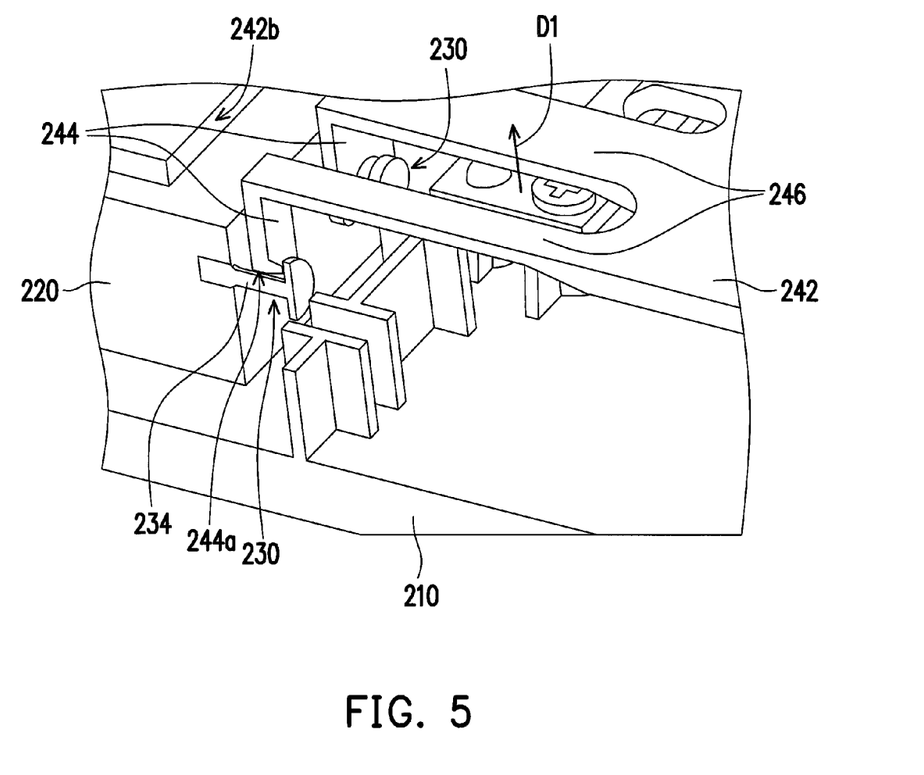
FIG. 5 is a schematic localized three-dimensional diagram of the electronic device in FIG. 4.
Figure 6:
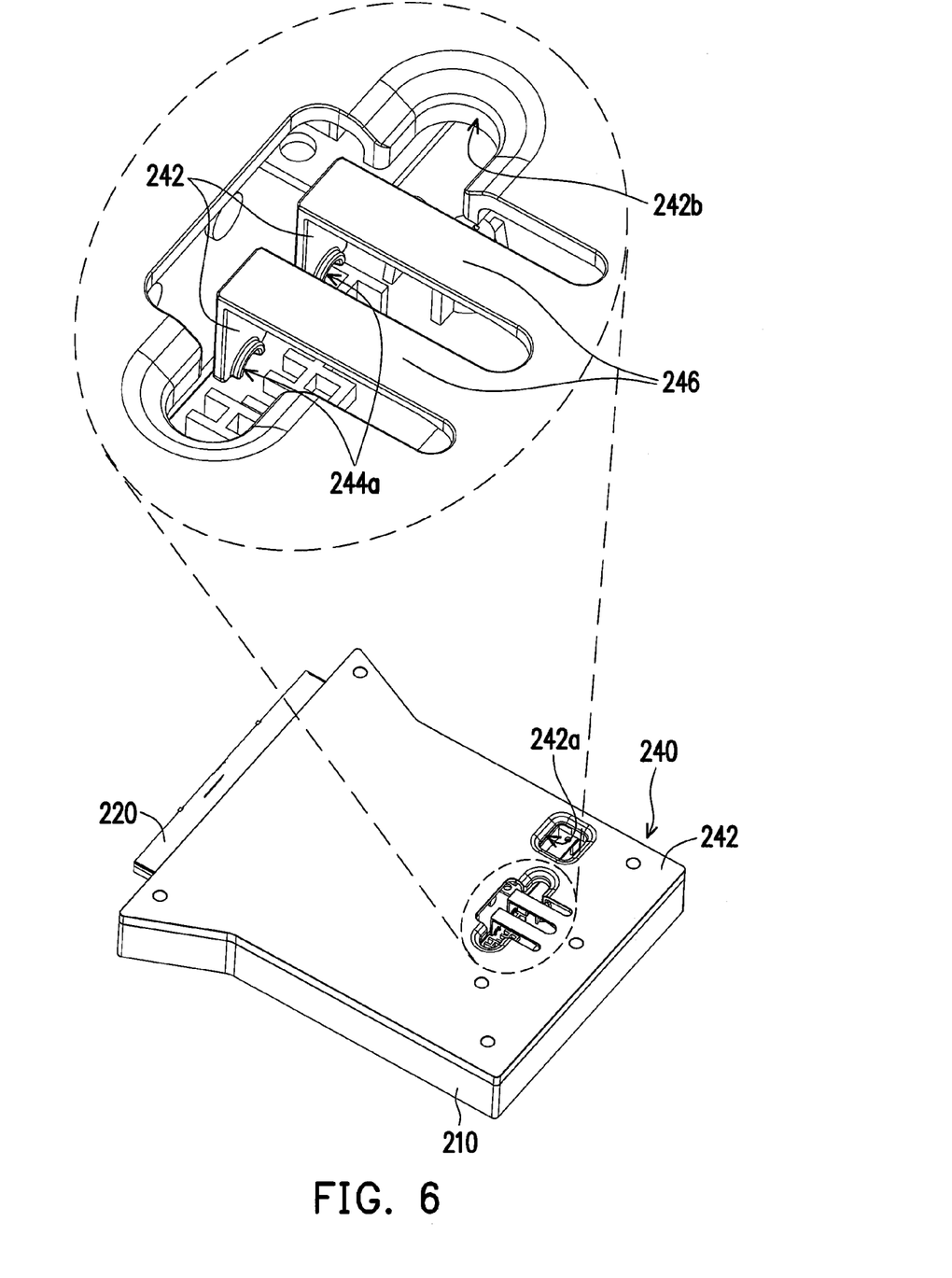
FIG. 6 is a schematic three-dimensional diagram showing the positioning parts of FIG. 4 are separated from the positioning portions.

FIG. 4 is a schematic three-dimensional diagram of an electronic device according to another embodiment of the invention, FIG. 5 is a schematic localized three-dimensional diagram of the electronic device in FIG. 4 and FIG. 6 is a schematic three-dimensional diagram showing the positioning parts of FIG. 4 separated from the positioning portions. Referring to FIGS. 4-6, in an electronic device 200 of the embodiment, an upper cover 240 comprises a cover body 242, at least a positioning portion 244 (two are shown) and at least an elastic arm 246 (two are shown). The elastic arms 246 are connected between the cover body 242 and the positioning portions 244 and suitable to be deformed under force to respectively bring a positioning groove 244a move away from the positioning part 230 so as to allow the electronic module 220 be taken out from the bottom casing 210. In addition, the cover body 242 of the embodiment has an operation opening 242b, and the elastic arms 246 are located in the operation opening 242a so as to be pulled via the operation opening 242b.

Figure 7:
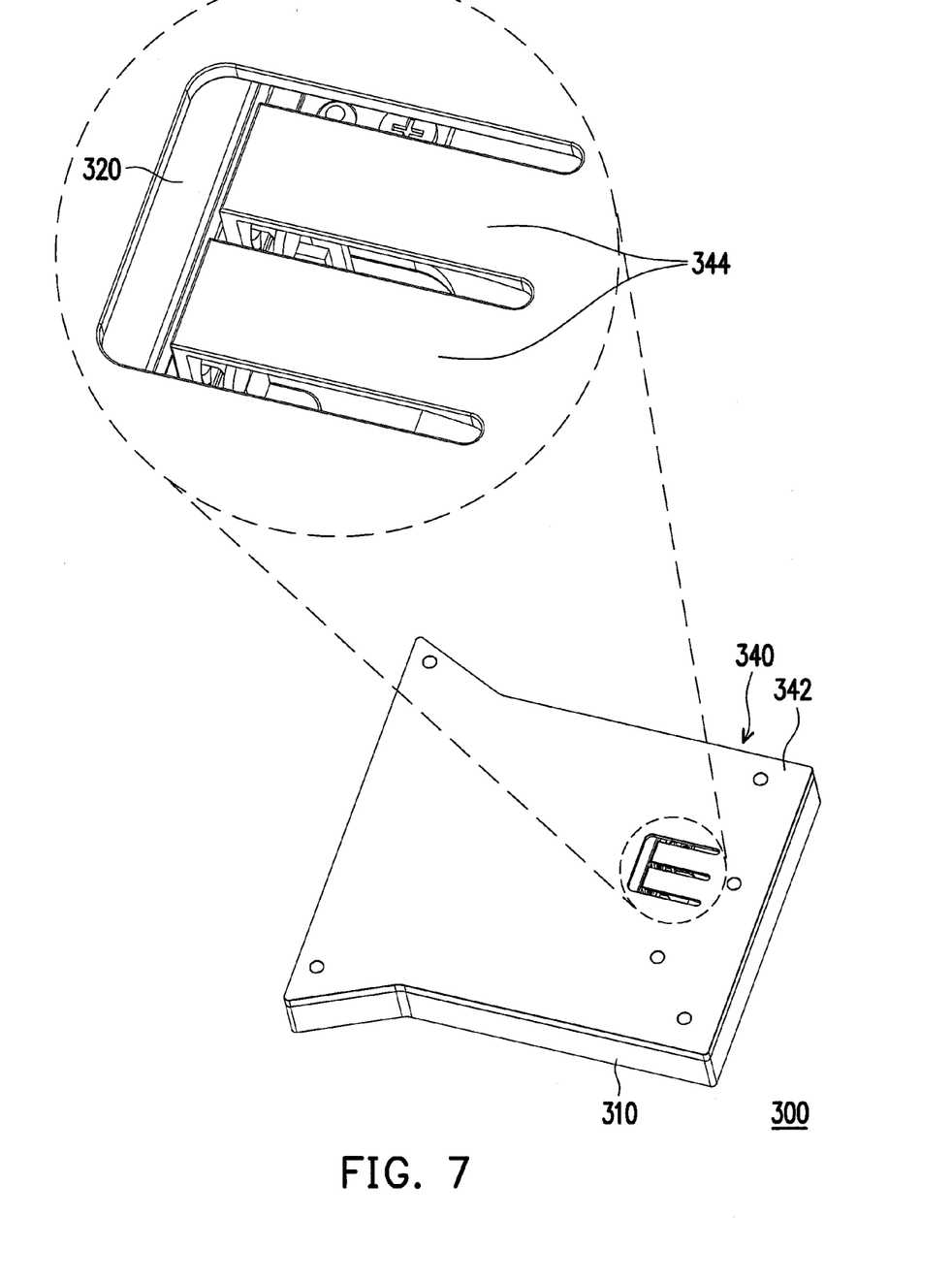
FIG. 7 is a schematic three-dimensional diagram of an electronic device according to yet another embodiment of the invention.
Figure 8:
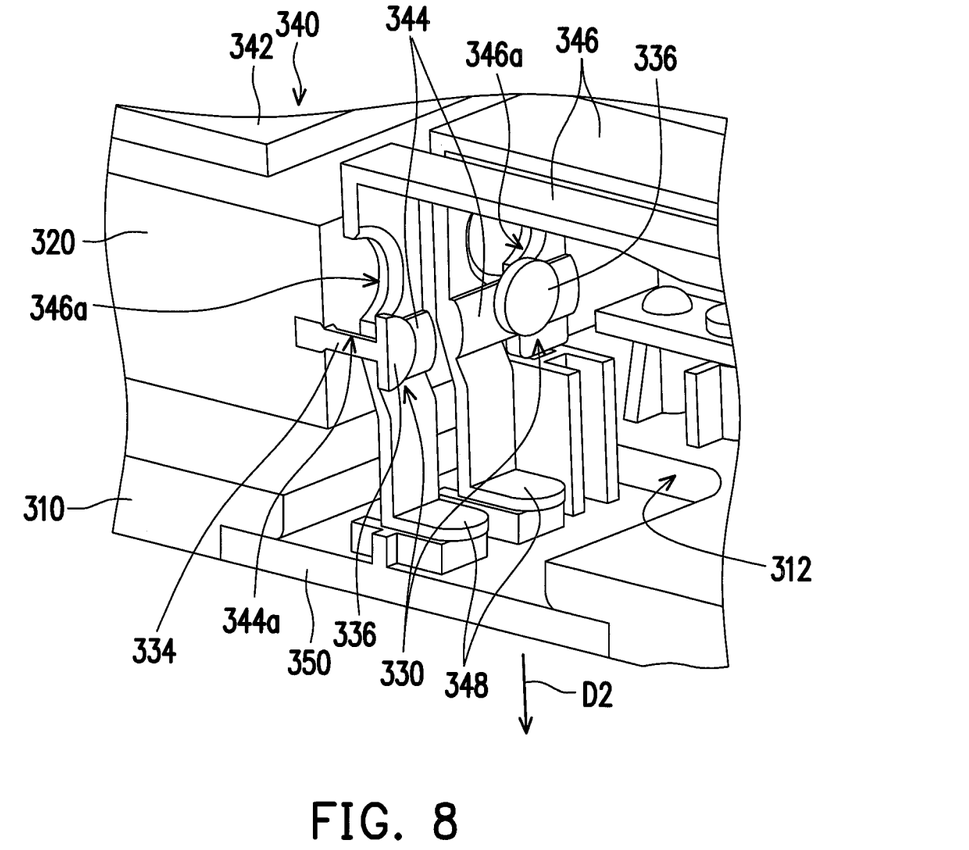
FIG. 8 is a schematic localized three-dimensional diagram of the electronic device in FIG. 7.
Figure 9:
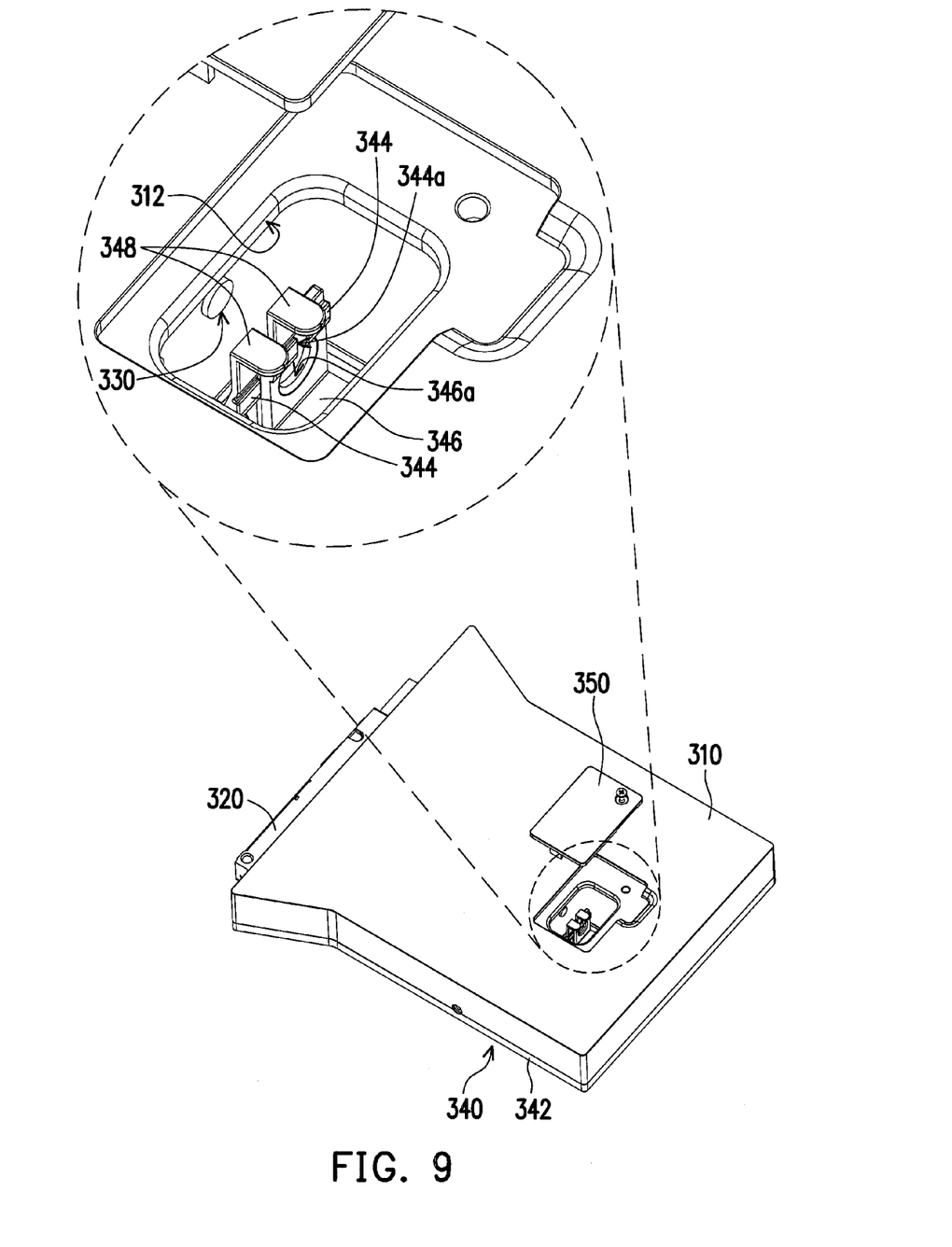
FIG. 9 is a schematic three-dimensional diagram in another point of view showing the positioning parts of FIG. 7 are separated from the positioning portions.

FIG. 7 is a schematic three-dimensional diagram of an electronic device according to yet another embodiment of the invention, FIG. 8 is a schematic localized three-dimensional diagram of the electronic device in FIG. 7 and FIG. 9 is a schematic three-dimensional diagram in another point of view showing the positioning parts of FIG. 7 separated from the positioning portions. Referring to FIGS. 7-9, in an electronic device 300 of the embodiment, an upper cover 340 comprises a cover body 342, at least a positioning portion 344 (two are shown), at least an elastic arm 346 (two are shown) and at least a pulling handle 348 (two are shown). The elastic arms 346 are respectively connected between the cover body 342 and each of the positioning portions 344 and respectively have a hole 346a. The positioning portions 344 are connected between the elastic arms 346 and the pulling handles 348. The inner diameter of the holes 346a is greater than the outer diameter of the two retaining portions 336 of the positioning parts, and the holes 346a are respectively connected to each of the two positioning grooves 344a. In this way, when a force is respectively applied on each of the pulling handles 348, the elastic arms 346 are deformed under force to respectively bring a movement of the hole 346a and a displacement of the positioning groove 344a, which makes the holes 346a aligned with the retaining portions 336 to allow the electronic module 320 be taken out from the bottom casing 310. In addition, the bottom casing 310 of the embodiment has an operation opening 312, and the pulling handles 348 extend towards the bottom casing 310 and are respectively aligned with the operation opening 312 so as to be pulled via the operation opening 312. In addition, the electronic device 300 further includes a cover part 350, which detachably covers the operation opening 312. When a user wants to assemble or disassemble the electronic module 320, the cover part 350 can be detached so as to expose the pulling handles 348 via the operation opening 312 to easily pull the pulling handles 348.

In following, the electronic device 100 of FIGS. 1-3 is taken as an example to describe the assembling method of electronic module according to an embodiment of the invention. First, the electronic module 120 shown by FIG. 3 is placed into the bottom casing 110. Next, the cover body 142 is assembled to the bottom casing 110 as the status shown by FIGS. 1 and 2. At the time, a structural interference is respectively established between the positioning portion 144 and each of the positioning parts 130 to fix the position of the electronic module 120. The above-mentioned structural interferences are established by moving the positioning portion 144 to between the retaining portions 136 and the electronic device 100. In more details, during assembling the cover body 142 to the bottom casing 110, the positioning grooves 144a would move to between the retaining portions 136 and the electronic module 120 and to include the joining portions 134 therein, so as to finish the job of assembling the electronic module 120.

In following, the electronic device 100 of FIGS. 1-3 is taken as an example to describe the disassembling method of electronic module according to an embodiment of the invention. First, the cover body 142 of FIG. 1 is separated from the bottom casing 110 to make the positioning portion 144 move away from the positioning parts 130. Next, the electronic module 120 is pushed out via the operation opening 142a as the status shown by FIG. 3. In more details, during separating the cover body 142 from the bottom casing 110, the positioning portion 144 would move away from between the retaining portions 136 and the electronic module 120 so as to move the positioning grooves 144a away from the joining portions 134, which allows the electronic module 120 to be taken out from the bottom casing 110.

In following, the electronic device 200 of FIGS. 4-6 is taken as an example to describe the assembling method of electronic module according to another embodiment of the invention. First, as shown by FIG. 6, the cover body 242 is assembled to the bottom casing 210. Next, a force is respectively applied on each of the two elastic arms 246 to make the elastic arms 246 deform under force to bring a displacement of the two positioning portions 244, which allows the two retaining portions 230 to move pass the positioning portions to provide a space for the electronic module 220 to move into the bottom casing 210. After that, the electronic module 220 is placed into the bottom casing 210 and the elastic arms 246 are restored so that the positioning grooves 244a moves to include the joining portions 234 as the status shown by FIGS. 4 and 5 to finish the job of assembling the electronic module 220. Referring to FIG. 5, in more details, the method of applying a force on each of the elastic arms 246 is, for example, pulling the elastic arm 246 along the direction D1 via the operation opening 242b so as to bring each of the positioning portions 244 elevated to provide a space for the electronic module 220 to move into the bottom casing 210. In addition, in another embodiment, the electronic module 220 can be firstly moved into the bottom casing 210, followed by assembling the cover body 242 to the bottom casing 210, so that structural interferences are established between the positioning portions 244 and the positioning parts 230 to finish the job of assembling the electronic module 220, which the invention is not limited to.

In following, the electronic device 200 of FIGS. 4-6 is taken as an example to describe the disassembling method of electronic module according to another embodiment of the invention. First, a force is respectively applied on each of the elastic arms 246 in FIGS. 4 and 5, so that the elastic arms 246 are deformed under force to bring the positioning grooves 244a move away from the positioning parts 230, which releases the positioning of the electronic module 220. Next, the electronic module 220 is pushed out from the bottom casing 210 via the operation opening 242a as the status shown by FIG. 6. Referring to FIG. 5, in more details, the method of applying a force on each of the elastic arms 246 is, for example, pulling the elastic arm 246 along the direction D1 via the operation opening 242b to bring the positioning portion 244 elevated to move away from the positioning part 230. In addition, in another embodiment, the cover body 242 can be separated from the bottom casing 210 firstly to release the structural interferences between the positioning portions 244 and the positioning parts 230, followed by moving out the electronic module 220 from the bottom casing 210, which the invention is not limited to.

In following, the electronic device 300 of FIGS. 7-9 is taken as an example to describe the assembling method of electronic module according to yet another embodiment of the invention. First, as shown by FIG. 9, the cover body 342 is assembled to the bottom casing 310. Next, a force is respectively applied on each of the two pulling handles 348 to make the elastic arms 346 deform under force to bring a displacement of the two positioning portions 344, which allows the two retaining portions 330 to pass through the positioning portions 344 via the holes 346a to provide a space for the electronic module 320 to move into the bottom casing 310. After that, the electronic module 320 is moved into the bottom casing 310 and the elastic arms 346 are restored so that the positioning grooves 344a moves to include the joining portions 334 as the status shown by FIGS. 7 and 8 to finish the job of assembling the electronic module 320. Referring to FIG. 8, in more details, the method of applying a force on each of the pulling handles 348 is, for example, removing the cover part 350 and pulling the pulling handles 348 along the direction D2 via the operation opening 312 so as to bring the holes descended and aligned with the positioning parts 330, which can provide a space for the electronic module 320 to move into the bottom casing 310. In addition, in another embodiment, the electronic module 320 can be firstly moved into the bottom casing 310, followed by assembling the cover body 342 to the bottom casing 310, so that structural interferences are established between the positioning portions 344 and the positioning parts 330 to finish the job of assembling the electronic module 320, which the invention is not limited to.

In following, the electronic device 300 of FIGS. 7-9 is taken as an example to describe the disassembling method of electronic module according to yet another embodiment of the invention. First, a force is respectively applied on each of the pulling handles 348 in FIGS. 7 and 8, so that the elastic arms 346 are deformed under force to bring the positioning grooves 344a to move away from the positioning parts 330, which releases the positioning of the electronic module 320. Next, the electronic module 320 is pushed out from the bottom casing 310 via the operation opening 312 as the status shown by FIG. 9. Referring to FIG. 8, in more details, the method of applying a force on each of the pulling handles 348 is, for example, removing the cover part 350 and pulling the pulling handles 348 along the direction D2 via the operation opening 312, which brings the holes 346a descended and aligned with the positioning parts 330 so as to allow the retaining portions 336 pass through the holes 346a to facilitate taking out the electronic module 320. In addition, in another embodiment, the cover body 342 can be separated from the bottom casing 310 firstly to release the structural interferences between the positioning portions 344 and the positioning parts 330, followed by moving out the electronic module 320 from the bottom casing 230, which the invention is not limited to.

In summary, the positioning part of the invention is connected to the electronic module and the upper cover has a positioning portion. After placing the electronic module into the bottom casing, the upper cover is assembled to the bottom casing so as to position the electronic module through the structural interference between the positioning portion and the positioning part to finish the assembling. In addition, moving away the positioning portion from the positioning part is able to release the above-mentioned structural interference so as to take out the electronic module. In this way, the invention makes assembling and disassembling the electronic module more quickly and conveniently. In addition, an elastic arm can be disposed between the cover body and the positioning portion so as to bring the positioning portion moving by means of the elastic deformation of the elastic arm, which makes the electronic module placed into the bottom casing or taken out from the bottom casing without removing the cover body, which further advances the convenience of assembling and disassembling the electronic module.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. An electronic device, comprising: a bottom casing;
    an electronic module, disposed in the bottom casing; at least a positioning part, connected to the electronic module; and an upper cover, comprising: a cover body, assembled to the bottom casing; and a positioning portion, connected to the cover body, wherein a structural interference between the positioning portion and the positioning part positions the electronic module;
    wherein the upper cover further comprises: an elastic arm, connected between the cover body and the positioning portion and having a hole, wherein an inner diameter of the hole is greater than an outer diameter of the positioning part and the hole is connected to the positioning portion; and a pulling handle, wherein the positioning portion is connected between the elastic arm and the pulling handle, and when a force is applied on the pulling handle, the elastic arm is deformed under the force to bring a displacement of the positioning portion and to align the hole to the positioning part.

2. The electronic device as claimed in claim 1, wherein the positioning part comprises:
    a fixing portion, fixed at the electronic module;
    a joining portion, connected to the fixing portion; and
    a retaining portion, connected to the joining portion, wherein the positioning portion is located between the retaining portion and the electronic module to position the electronic module.

3. The electronic device as claimed in claim 2, wherein the positioning portion has at least a positioning groove, a width of the positioning groove is greater than an outer diameter of the joining portion, the width of the positioning groove is less than an outer diameter of the retaining portion, the joining portion goes through the positioning groove and the positioning groove is located between the retaining portion and the electronic module.

4. The electronic device as claimed in claim 1, wherein the positioning portion is a folding wall extending from the cover body and the cover body is suitable to be moved away from the bottom casing so as to bring the positioning portion move away from the positioning part.

5. The electronic device as claimed in claim 1, wherein the upper cover further comprises an elastic aim, the elastic aim is connected between the cover body and the positioning portion and the elastic aim is suitable to be deformed to bring the positioning portion move away from the positioning part.

6. The electronic device as claimed in claim 1, wherein the bottom casing has an operation opening, and the pulling handle extends towards the bottom casing and is aligned with the operation opening so as to be pulled via the operation opening.

7. The electronic device as claimed in claim 6, further comprising a cover part, wherein the cover part detachably covers the operation opening.

* * * * *